Patented June 5, 1934

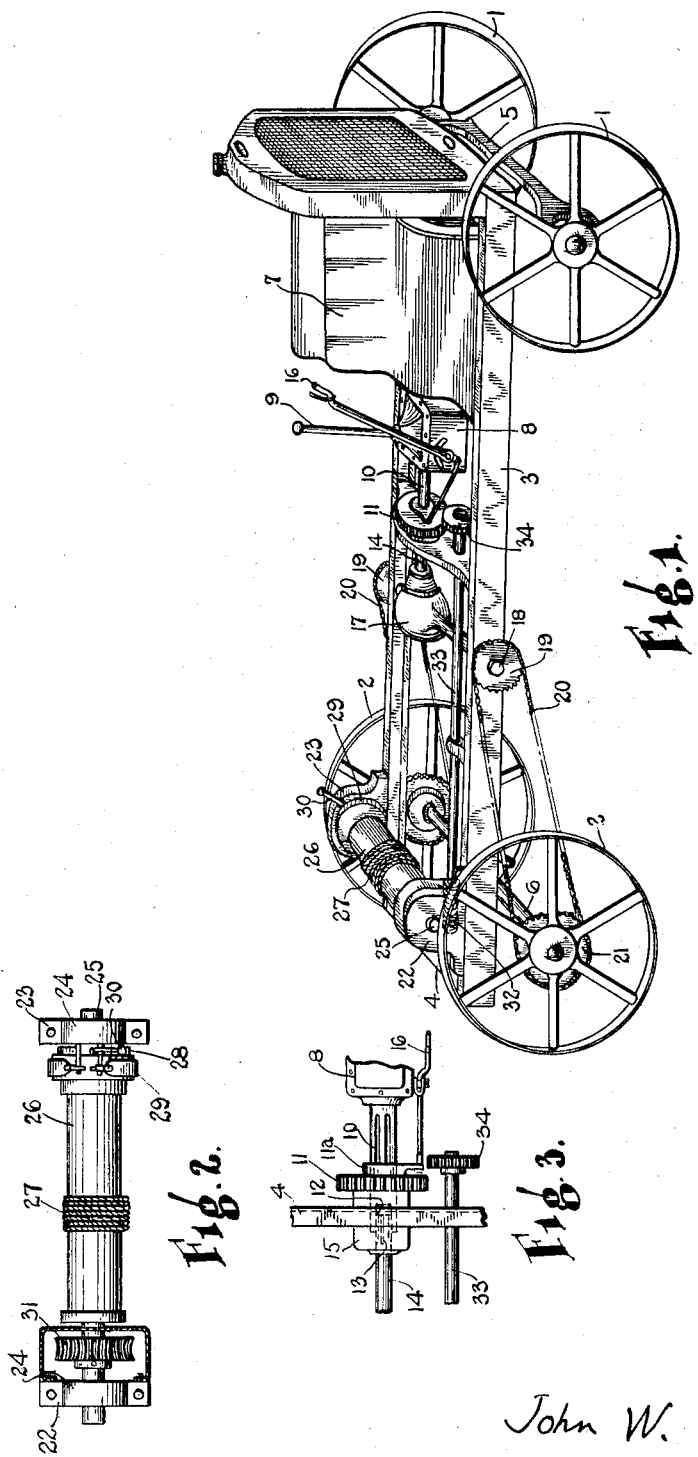

1,961,513

UNITED STATES PATENT OFFICE 1,961,513

WELL SWABBING DEVICE

John W. Gill, Medina, Ohio, assignor of one-half to R. G. Dreher, Medina, Ohio

Application July 31, 1930, Serial No. 472,141

1 Claim. (Cl. 180—53)

This invention relates to a vehicle particularly adapted for the swabbing of oil wells, and the like.

In the operation of oil wells and the like, it is frequently found advantageous to clean the interior of the well casing, by what is known as a swabbing operation. This operation consists of lowering a weighted swab down the casing, and, of course, drawing it up therefrom. It has been customary, to effect this operation, to take a portable winch to the casing, lowering the swab on the end of a cable, and reeling in the cable by means of the winch, after which the winch is carried to another well, and the operation repeated.

An object of the invention is to provide an improved automotive vehicle which may be conveniently driven from well to well, and by which the driving motor may be caused to operate the swab.

Other objects will hereinafter appear.

The invention will be better understood from the description of the embodiment illustrated in the accompanying drawing, in which:

Figure 1 is a perspective view of the vehicle embodying the invention.

Figure 2 is a fragmentary plan view of the cable drum and associated parts; and

Figure 3 is a fragmentary plan view of the clutch mechanism for connecting the motor with the wheels or cable drum.

The vehicle is illustrated as supported upon a pair of dirigible front wheels 1, and motor driven rear wheels 2. Upon the wheels is supported a frame consisting of side frame members 3 and transverse members 4, in general similar to an automobile or tractor frame. This may be connected to the axles 5 and 6 of the pairs of wheels in any well known or desired manner, either rigidly or resiliently. The rear wheels 2 may be provided with transverse cleats or lugs similar to those used by tractors.

The steering mechanism (not shown) is provided for the control of the front wheels. Upon the forward part of the frame is mounted a motor 7 provided at its rear with a clutch through which the motor drives the gearing of a transmission enclosed in a transmission housing 8, the gears of the transmission being manipulated by a gear shift lever 9. The driven shaft 10 of the transmission extends but a short distance behind the transmission casing and has splined to it a spur gear 11 formed at its rear end with clutch faces or jaws 12 adapted to be selectively engaged with similar clutch jaws 13 formed on the forward end of a propeller shaft 14, so that the two shafts may be clutched together when the gear 11 is moved to its rearmost position.

The ends of these shafts may be supported in a bearing member 15 carried by a cross frame member 4. The motion for moving gear 11 is transmitted to the gear through a sleeve 11a by means of a handle 16. The propeller shaft enters a differential casing 17 secured to the side frame members and drives, through differential gearing therein, two transverse shafts 18. Each of these shafts is provided on its outer end with a sprocket 19 and chain 20, connecting the sprockets to sprockets 21 secured to the rear wheels.

When the clutch members 12 and 13 are engaged with each other, it will be seen that the vehicle may be propelled in an ordinary manner, its speed controlled by the clutch and transmission, as well as by its fuel control.

Mounted upon the rear end of the frame are two supporting brackets 22 and 23 having bearings 24 in which is journalled a transverse shaft 25. Rotatably carried upon the shaft is a cable drum 26 provided with a cable 27 and which may be locked to the shaft by a clutch 28 carried adjacent the bracket 23. Also, at this end of the drum, a brake 29 is provided to restrain or prevent rotation of the drum with respect to the bracket, the clutch and brake being controlled by a handle 30. Within the bracket 22 is housed a worm wheel 31 keyed to the transverse shaft and in mesh with this worm wheel is a worm 32 carried upon and keyed to a forwardly extending shaft 33, the forward end of which is journalled upon the frame and provided with a gear 34. This gear or pinion is caused to mesh with the gear 11 when the former is moved into its forward position, at which time obviously the clutch jaws 12 and 13 are disengaged, so that the motor may be caused to drive the transverse shaft 25 through the usual clutch and transmission, and, by the operation of clutch 30, to rotate the drum for reeling in the cable.

If the transmission used is one which has four speeds ahead, it will be obvious that the drum may be rotated with any of the pairs of driving gears engaged, so that there will be four gear ratios through which the drum may be driven. This is particularly advantageous as differing conditions in different wells and the different operations, such as those known as swabbing, bailing, spudding, require many variations in the speed at which the cable is reeled in.

In operation, the swab is attached to the end of the cable 27, the drum released from its shaft by the operation of clutch 30, and the swab allowed to drop down the well, the drum rotating freely on its shaft and its rotation controlled by brake 29. When it is desired to draw the swab up the well, it is simply necessary to clutch the drum at its shaft and drive this shaft by the vehicle motor in the direction to reel in the cable. The vehicle, in being propelled, drives both rear wheels through the differential mechanism, and the drum may be locked and retained in stationary position by means of its brake.

While I have described the illustrated embodiment of my invention in some particularity, this is done by way of illustration only, it being obvious that many other embodiments will readily occur to those skilled in this art, and I do not, therefore, limit myself to the precise details shown and described, but claim as my invention all embodiments coming within the scope of the appended claim.

I claim:

A well swabbing device comprising an automotive vehicle having front and rear axles, a frame, a motor, means for selectively connecting the motor to one of said axles, a gear on the motor shaft, a winch supported on said frame transversely thereof and substantially above the rear axle in such a position that a vertical tangent to the rear of the winch drum will lie to the rear of the axle and frame, a longitudinally extending shaft carried by the frame, a gear upon said shaft and engageable with the first mentioned gear to be rotated by the motor, a worm fixed to said shaft, a worm wheel secured to the winch meshing therewith, and a brake controlling the rotation of the winch.

JOHN W. GILL.